United States Patent Office 3,758,480
Patented Sept. 11, 1973

3,758,480
s-TRIAZOLO[5,1-a]ISOQUINOLINES AND
DERIVATIVES THEREOF
Hans K. Reimlinger, Brussels, and Jan Joseph Maurice Vandewalle, Mortsel, Belgium, assignors to Mallinckrodt Chemical Works, St. Louis, Mo.
No Drawing. Filed July 10, 1968, Ser. No. 743,628
Int. Cl. C07d 35/34
U.S. Cl. 260—288 R     1 Claim

ABSTRACT OF THE DISCLOSURE s-Triazolo[5,1-a]isoquinolines are prepared by cyclization of a N-(1-isoquinolyl)amidine. 5,6-dihydro-s-triazolo[5,1-a]isoquinolines are prepared by reducing the s-triazolo[5,1-a]isoquinolines. The novel compounds of the invention are useful as antioxidants, corrosion inhibitors, as reaction intermediates, and as acid acceptors.

---

The invention relates to s-triazolo[5,1-a]isoquinolines and to 5,6-dihydro-s-triazolo[5,1-a]isoquinolines. These two classes of compounds have the following basic structures:

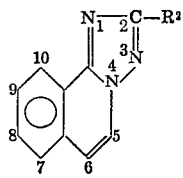

s-Triazolo[5,1-a]isoquinolines

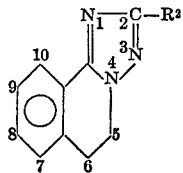

5,6-dihydro-s-triazolo[5,1-a]isoquinolines wherein the $R^2$ variable is as defined below.

The s-triazolo[5,1-a]isoquinolines can be produced by the following sequence of reactions, starting with known types of reactants:

(a) A 1-aminoisoquinoline is reacted with a nitrile to produce an N-(1-isoquinolyl)amidine:

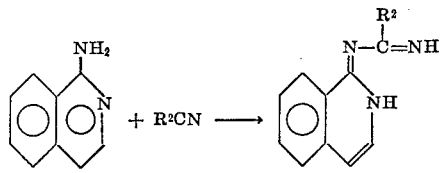

(b) The N-(1-isoquinolyl)amidine is then contacted with lead tetraacetate to effect ring closure and thereby produce the s-triazolo[5,1-a]isoquinoline:

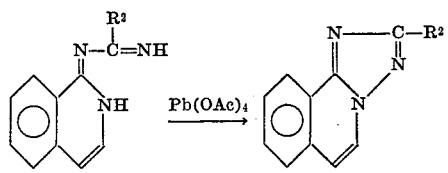

Reaction (a) is carried out by reacting a 1-aminoisoquinoline with a nitrile. Ordinarily, a Lewis acid catalyst is used, although in some cases, no catalyst is needed. The nitriles that are used are compounds of the formula:

(I)          $R^2$—CN wherein $R^2$ represents alkyl, alkaryl, aralkyl, aryl, haloalkyl, cycloalkyl, heterocyclic groups, alkoxyalkyl groups, and the like.

Specific illustrative nitriles that can be used in the invention include the following compounds:

acetonitrile,
propionitrile,
butyronitrile,
valeronitrile,
hexanenitrile,
heptanenitrile,
octanenitrile,
decanenitrile,
dodecanenitrile,
tetradecanenitrile,
hexadecanenitrile,
octadecanenitrile,
eicosanenitrile, and other alkanenitriles having up to 20 carbon atoms. The preferred alkanenitriles are those having up to six carbon atoms, and those having from two to four carbon atoms are more preferred.

Other useful nitriles include the aromatic and cycloalkyl nitriles such as the following compounds:

benzonitrile,
cyclohexanenitrile,
cyclopentanitrile,
p-methylbenzonitrile,
phenylacetonitrile (benzyl cyanide),
α-phenylbutyronitrile, and the like.

Other useful nitriles include the haloalkyl nitriles such as the following compounds:

chloroacetonitrile,
trichloroacetonitrile,
trifluoroacetonitrile,
fluoroacetonitrile,
β-chloropropionitrile,
β-bromopropionitrile,
γ-chlorobutyronitrile,
α-chloroisobutyronitrile, and the like.

Still other useful nitriles include the heterocyclic nitriles such as the following compounds:

α-cyanotetrahydrofuran
2-furylacetonitrile,
2-cyanopyridine,
N-(β-cyanoethyl)pyrrole, and the like.

Other useful nitriles include methoxyacetonitrile, β-methoxypropionitrile, ethoxyacetonitrile, and the like.

The nitriles that are employed in the invention are a well known class of compounds that can be obtained by known procedures. Nitriles are readily prepared, for instance, by reaction of benzyl chlorides or primary or secondary alkyl chlorides with alkali metal cyanide, by reaction of potassium arylsulfonic acid salts with potassium cyanide, by the dehydration of an amide, by dehydration of oximes, or by other known procedures.

In reaction (a), the other starting reactant is a 1-aminoisoquinoline. These compounds can be obtained by the following types of reactions:

(c) The known reaction of unsubstituted isoquinoline or hydrocarbyl-substituted isoquinolines with sodium amide in liquid ammonia:

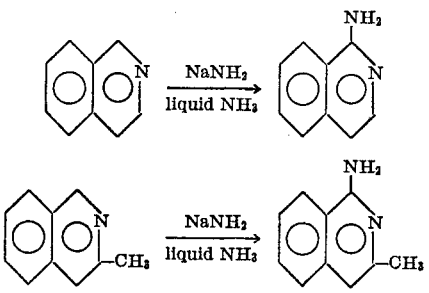

(d) The known reaction of 1,3-dichloroisoquinolines with alcoholic ammonia at 180° C.:

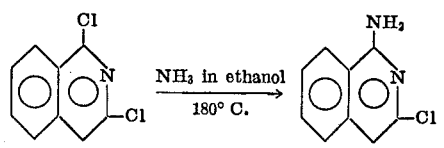

(e) The known reduction of a 1-hydrazinoisoquinoline (prepared by reacting a 1-chloroisoquinoline with hydrazine) with hydrogen using a palladium catalyst:

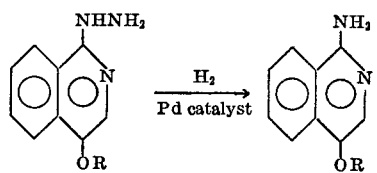

(in the published cases, R was ethyl or butyl, but it can be other alkyl, aryl, or the like).

(f) Reaction of a 1-methoxyisoquinoline with sodium amide and liquid ammonia at atmospheric pressure in refluxing toluene:

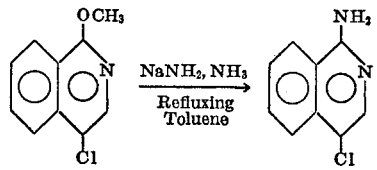

1-methoxyisoquinolines are produced by refluxing 1-chloroisoquinolines with sodium methoxide in methanol. Under these conditions, chloro substituents on the 4 position do not react. By this procedure, 1-amino-4-chloroisoquinolines can be produced.

(g) 1-amino-4-nitroisoquinolines can be prepared by the conventional nitration of a 1-aminoisoquinoline. The nitro group does not interfere with reactions (a) and (b), and it can be used subsequently for producing derivatives of s-triazolo-[5,1-a]isoquinolines having substituents in the 6 position. The nitration reaction is exemplified by the following:

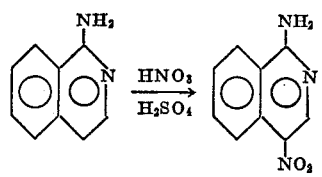

(h) 1-aminoisoquinolines having alkoxy substituents in the benzene ring or other easily reducible substituents can be produced by the following sequence of reactions:

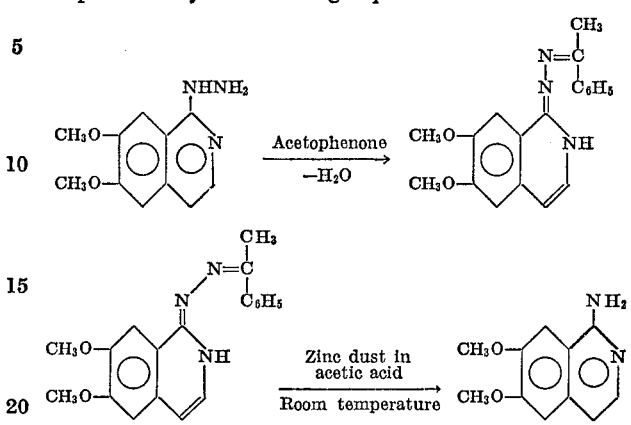

The foregoing techniques can be used to prepare a wide variety of 1-aminoisoquinolines. Unsubstituted and hydrocarbyl-substituted 1-aminoisoquinolines are readily available via reaction (c). 1-aminoisoquinolines containing chloro substituents are readily available via reactions (d) or (f). 1-amino-4-nitroisoquinolines can be produced by reaction (g). 1-amino-isoquinolines containing alkoxy substituents are available through the corresponding 1-hydrazinoisoquinolines by reactions (e) and (h). The corresponding 1-hydrazinoisoquinolines are readily prepared by the known reaction of a 1-chloroisoquinoline with hydrazine. Many 1-chloroisoquinolines are known. A useful method for synthesizing 1-chloroisoquinolines is to react an isocarbostyril with phosphorus oxychloride in accordance with the following reaction:

(i)

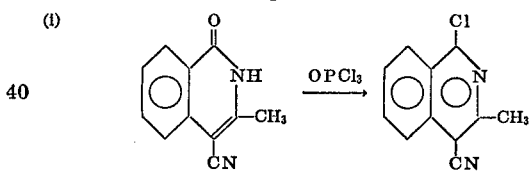

In preparing a 1-hydrazinoisoquinoline from a 1-chloroisoquinoline that contains additional chloro substituents, the reaction with hydrazine should be carried out in methanol. The 1-hydrazinoisoquinoline is formed first, and it then precipitates from solution thereby avoiding the preparation of poly-hydrazinoisoquinolines.

Among the 1-aminoisoquinolines that can be used in reaction (a) are the following compounds:

1-aminoisoquinoline,
1-amino-3-chloroisoquinoline,
1-amino-4-chloroisoquinoline,
1-amino-3-methylisoquinoline,
1-amino-3-methyl-4-cyanoisoquinoline,
1-amino-4-ethoxyisoquinoline,
1-amino-4-butoxyisoquinoline,
1-amino-4-nitroisoquinoline,
1-amino-6,7-dimethoxyisoquinoline,
1-amino-5,6,7-trimethoxyisoquinoline,
1-amino-7-methoxyisoquinoline,
1-amino-6-methoxyisoquinoline,
1-amino-3-ethylisoquinoline,
1-amino-5-methoxyisoquinoline,
1-amino-7-chloroisoquinoline,
1-amino-3-phenylisoquinoline,
1-amino-3-phenyl-4-chloroisoquinoline, and the like.

The preferred 1-aminoisoquinolines are unsubstituted 1-aminoisoquinoline and derivatives thereof containing alkoxy, alkyl, chloro, and nitro substituents.

Reaction (a) is carried out by reacting a 1-aminoisoquinoline with a nitrile. In most cases, a Lewis acid catalyst is required for the reaction, although with some nitriles containing fluoro substituents on the alpha carbon atom, no catalyst is needed. The Lewis acid catalysts used are compounds such as aluminum trichloride, titanium tetrachloride, tetraisopropyl titanate, boron trifluoride, and the like. Aluminum trichloride is preferred. The catalyst is employed in catalytically effective quantities, such as from about 10 to 150 weight percent, and preferably from about 50 to 120 weight percent, based upon weight of the 1-aminoisoquinoline.

With some nitriles having one or more fluoro substituents on the alpha carbon atom, no catalyst is needed. For instance, when trifluoroacetonitrile is used in reaction (a), no catalyst is required.

The exact temperature to be used in the reaction depends, in part, upon the nature of the reactants, and particularly upon the nature of the nitrile. For instance, when trifluoroacetonitrile is used in reaction (a), the reaction proceeds at room temperature. With less reactive nitriles, higher temperatures are used. For instance, temperatures of from about 150° C. to about 210° C. can be used, with temperatures of from about 175° to about 200° C. being preferred.

The reaction is conveniently carried out in an inert solvent either by adding catalyst to a solution of nitrile plus 1-aminoisoquinoline, or by adding nitrile to a solution of 1-aminoisoquinoline (either with or without a catalyst). In any event, it is desirable to avoid adding nitrile to catalyst without a 1-aminoisoquinoline being present in order to avoid trimerization of the nitrile to an s-triazine which will reduce the yields of the desired amidine product of reaction (a).

Suitable inert solvents include hydrocarbons such as benzene, toluene, xylene, naphthalene, methylnaphthalene and the like.

The proportions of the reactants are not narrowly critical. About stoichiometric proportions can be used, although higher yields are obtained in most cases when excess nitrile is employed. It is therefore desirable to employ up to about 150 percent molar excess of nitrile.

The reaction can be carried out in conventional equipment at atmospheric pressure, or under super-atmospheric pressure in the event that the reaction is to be carried out at a temperature exceeding the boiling point of any of the reactants or solvent. In such cases, the reaction is preferably carried out in a closed vessel under autogenous pressure.

Reaction (a) is carried out for a period of time sufficient to produce an N-(1-isoquinolyl)amidine. The exact time selected will vary, to an extent, with the reaction temperature and the nature of the amidine. Usually, the higher temperature reactions are faster, for instance, from about ½ to about 5 hours, and preferably from about 2 to about 3 hours. The reactions that are carried out at low temperatures, e.g., those wherein the nitrile is activated by fluoro substituents or the alpha carbon atom, normally are slower. For instance, reaction times of up to 100 hours, and preferably from about 25 to about 80 hours, can be employed.

The amidine product is recovered by conventional procedures. For instance, the reaction mixture containing catalyst, product, and unreacted starting material can be poured into aqueous acid (such as hydrochloric acid) to form a water-soluble amidine salt. The solvent can then be decanted, after which the aqueous mixture can be cooled and alkali added to precipitate the organic materials (i.e., product and unreacted starting material). The crude amidine can then be purified by dissolving it in diethyl ether, drying the ethereal solution, and evaporating the ether. The amidine can be further purified by dissolving it in benzene and passing the benzene solution through a neutral aluminum oxide column. The unreacted starting material is adsorbed in the column, and the pure amidine is recovered by evaporating the benzene.

In cases where no Lewis acid catalyst is used, it is not necessary to use water extraction. In many cases, the amidine can be recovered simply by evaporating the solvent. In some cases, it may also be desirable to pass a solution of the amidine through a neutral aluminum oxide column in order to remove unreacted starting material.

In the second step for producing the s-triazolo[5,1-a] isoquinolines of the invention, i.e., reaction (b), the amidine product of reaction (a) is contacted with lead tetraacetate to effect ring closure and thereby produce an s-triazolo[5,1-a]isoquinoline. This reaction is carried out simply by heating a mixture of the amidine and lead tetraacetate in a suitable solvent for a period of time sufficient to effect ring closure. The temperature can vary from about 75° C. to about 125° C. The reaction time will vary depending on the temperature, nature of the amidine, and the like, but in general will be from about 10 minutes to about 45 minutes.

A convenient way to carry out reaction (b) is to reflux a mixture of amidine and dry lead tetraacetate in a solvent having a suitable boiling point. Such solvents include benzene, toluene, xylene, cyclohexane, glacial acetic acid, or mixtures thereof.

The lead tetraacetate is preferably used in at least stoichiometric proportions. For instance, from about 1.1 to about 2 moles of lead tetraacetate per mole of amidine is suitable in most cases.

The s-triazolo[5,1-a]isoquinoline product of reaction (b) can be recovered by conventional procedures. For instance, the cooled reaction mixture can be washed with aqueous alkali, and the product can be separated from the basic aqueous mixture as a solution in a hydrocarbon solvent such as benzene. After drying, the solvent can be removed by evaporation to yield the product. Further purification by recrystallization can be performed if desired.

Among the s-triazolo[5,1-a]isoquinolines that can be produced, by the sequence of reactions (a) and (b) described above, from known and/or readily available nitriles and 1-aminoisoquinolines, are the following specific illustrative compounds:

2-methyl-s-triazolo[5,1-a]isoquinoline,
2-ethyl-s-triazolo[5,1-a]isoquinoline,
2-propyl-s-triazolo[5,1-a]isoquinoline,
2-butyl-s-triazolo[5,1-a]isoquinoline,
2-pentyl-s-triazolo[5,1-a]isoquinoline,
5-chloro-2-methyl-s-triazolo[5,1-a]isoquinoline,
6-chloro-2-methyl-s-triazolo[5,1-a]isoquinoline,
2,5-dimethyl-s-triazolo[5,1-a]isoquinoline,
2,5-dimethyl-6-cyano-s-triazolo[5,1-a]isoquinoline,
9-chloro-2-methyl-s-triazolo[5,1-a]isoquinoline,
2-ethyl-6-nitro-s-triazolo[5,1-a]isoquinoline,
6-ethoxy-2-methyl-s-triazolo[5,1-a]isoquinoline,
6-butoxy-2-hexyl-s-triazolo[5,1-a]isoquinoline,
7-methoxy-2-methyl-s-triazolo[5,1-a]isoquinoline,
8-methoxy-2-methyl-s-triazolo[5,1-a]isoquinoline,
9-methoxy-2-methyl-s-triazolo[5,1-a]isoquinoline,
8,9-dimethoxy-2-methyl-s-triazolo[5,1-a]isoquinoline,
7,8,9-trimethoxy-2-methyl-s-triazolo[5,1-a]isoquinoline, and other 2-alkyl-s-triazolo[5,1-a]isoquinolines.

Other illustrative compounds include:

2-phenyl-s-triazolo[5,1-a]isoquinoline,
2-cyclohexyl-s-triazolo[5,1-a]isoquinoline,
2-cyclopentyl-s-triazolo[5,1-a]isoquinoline,
2-tolyl-s-triazolo[5,1-a]isoquinoline,
2-phenylmethyl-s-triazolo[5,1-a]isoquinoline,
5-chloro-2-phenyl-s-triazolo[5,1-a]isoquinoline,
6-chloro-2-phenyl-s-triazolo[5,1-a]isoquinoline,
8-methoxy-2-phenyl-s-triazolo[5,1-a]isoquinoline, and other 2-aryl-, 2-cycloalkyl-, 2-alkaryl-, and 2-aralkyl- s-triazolo[5,1-a]isoquinolines.

Additional specific illustrative compounds include:

2-trifluoromethyl-s-triazolo[5,1-a]isoquinolines,
2-chloromethyl-s-triazolo[5,1-a]isoquinoline,
2-trichloromethyl-s-triazolo[5,1-a]isoquinoline,
2-fluoromethyl-s-triazolo[5,1-a]isoquinoline,
2-(beta-chloroethyl)-s-triazolo[5,1-a]isoquinoline,
2-(gamma-chloropropyl)-s-triazolo[5,1-a]isoquinoline,
7,8,9-trimethoxy-2-trifluoromethyl-s-triazolo[5,1-a]isoquinoline,
6-nitro-2-trifluoromethyl-s-triazolo[5,1-a]isoquinoline, and other 2-haloalkyl-s-triazolo[5,1-a]isoquinolines.

Further illustrative compounds include:

2-methoxymethyl-s-triazolo[5,1-a]isoquinoline,
2-(beta-methoxyethyl)-s-triazolo[5,1-a]isoquinoline,
2-ethoxymethyl-s-triazolo[5,1-a]isoquinoline,
2-(2-pyridyl)-s-triazolo[5,1-a]isoquinoline, and the like.

Another way to prepare substituted s-triazolo[5,1-a]isoquinoline derivatives is to react a readily obtainable s-triazolo[5,1-a]isoquinoline (such as one containing one or more chloro substituents) in accordance with known reactions in order to introduce other substituent groups. The following reactions, where R represents an s-triazolo[5,1-a]isoquinolyl group, are illustrative:

(j) 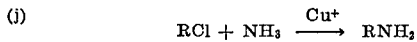

(k) 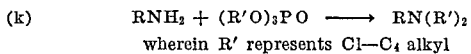
wherein R' represents $C_1-C_4$ alkyl (l) 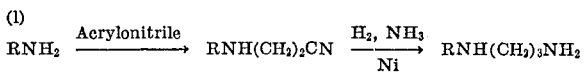

(m) 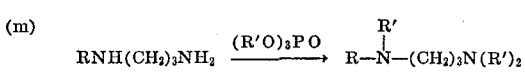

(n) 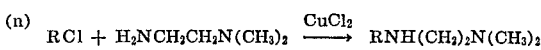

(o) 

(p) 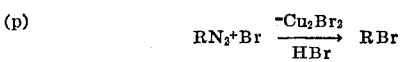

(q) 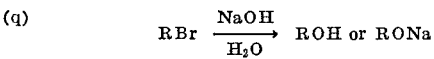

(r) 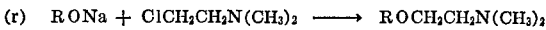

(s) 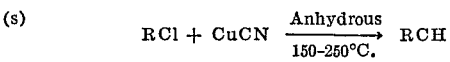

(t) 

(u) 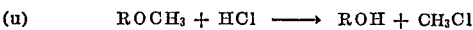

(v) 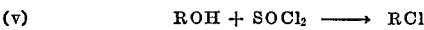

(w) 

(x) 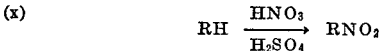

(y) 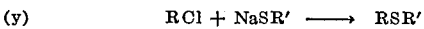

(z) 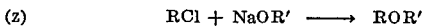

Among the s-triazole[5,1-a]isoquinolines that can be produced by the above-exemplified reactions (j) through (z) are the following specific illustrative compounds:

2-methyl-5-dimethylamino-s-triazolo[5,1-a]isoquinoline,
2-trifluoromethyl-9-(3-aminopropylamino)-s-triazolo[5,1-a]-isoquinoline,
2-phenyl-6-(2-dimethylaminoethylamino)-s-triazolo[5,1-a]isoquinoline,
2-methyl-5-bromo-s-triazolo[5,1-a]isoquinoline,
2-phenyl-6-bromo-s-triazolo[5,1-a]isoquinoline,
2-trifluoromethyl-9-bromo-s-triazolo[5,1-a]isoquinoline,
2-methyl-5-(2-dimethylaminoethoxy)-s-triazolo[5,1-a]isoquinoline,
2-methyl-9-cyano-s-triazolo[5,1-a]isoquinoline,
2-trifluoromethyl-6-thiocyano-s-triazolo[5,1-a]isoquinoline,
2-methyl-8,9-dichloro-s-triazolo[5,1-a]isoquinoline,
2,5-dimethyl-6-aminomethyl-s-triazolo[5,1-a]isoquinoline,
2-phenyl-7-nitro-s-triazolo[5,1-a]isoquinoline,
2-trifluoromethyl-6-ethylthio-s-triazolo[5,1-a]isoquinoline, and the like.

As is apparent from the foregoing discussion, a wide variety of s-triazolo[5,1-a]isoquinolines are within the scope of the invention. For instance, the compounds that are within the invention can be illustrated by Formula II:

(II) 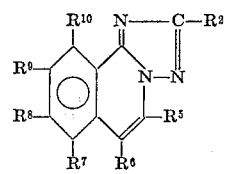

wherein $R^2$ represents alkyl, alkaryl, aralkyl, aryl, haloalkyl, cycloalkyl, heterocyclic groups (particularly 5- or 6-membered rings containing oxygen or nitrogen as the hetero atom), and alkoxyalkyl. Usually, the $R^2$ variable will contain not more than 20, and preferably, not more than 10, carbon atoms. The most preferred $R^2$ variables are lower alkyl (i.e., $C_1-C_4$ alkyl) and especially methyl, trifluoromethyl, and phenyl. The $R^5$, $R^6$, $R^7$, $R^8$, $R^9$, and $R^{10}$ variables individually can be hydrogen, alkyl, alkoxy, halo, nitro, cyano, amino, dialkylamino, aminoalkylamino, dialkylaminoalkylamino, hydroxyl, dialkylaminoalkoxy, thiocyano, aminoalkyl and alkylthio. Usually the substituent group will contain not more than 20 carbon atoms, and preferably not more than 8 carbon atoms. Preferred substituent groups include bromo, chloro, lower alkoxy and lower alkyl (i.e., $C_1-C_4$ alkoxy and alkyl) especially methoxy, methyl and ethyl, cyano, amino, dimethylamino, diethylamino, 2-aminoethylamino, 3-aminopropylamino, 2-dimethylaminoethylamino, 3-dimethylaminopropylamino, 2-diethylaminoethoxy, aminomethyl, $C_1-C_4$ alkylthio and hydrogen.

A second class of compositions that are provided by the invention are the 5,6-dihydro-s-triazolo[5,1-a]isoquinolines such as those that are represented by Formula III:

(III) 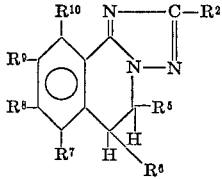

wherein $R^2$, $R^5$, $R^6$, $R^7$, $R^8$, $R^9$, and $R^{10}$ are as defined in Formula II, above. The 5,6-dihydro-s-triazolo[5,1-a]isoquinolines of the invention can be produced by hydrogenation, under conditions described below, of the corresponding s-triazolo[5,1-a]isoquinoline, or by hydrogenation of an s-triazolo[5,1-a]isoquinoline followed by the preparation of derivatives by known reactions such as reactions (j) through (z), above.

The hydrogenation reaction can be conveniently carried out in accordance with the following procedure:

The s-triazolo[5,1-a]isoquinoline to be hydrogenated is charged to a conventional pressure vessel, such as an autoclave, along with an inert solvent such as ethanol or isopropanol. A catalytic quantity of a hydrogenation catalyst is then added. Useful catalysts include nickel, palladium or platinum deposited on charcoal, with palladium on charcoal being preferred. Useful catalytic quantities for 1 mole of s-triazolo[5,1-a]isoquinoline have been found to be from about 20 to 40 grams of a catalyst consisting of about 5 weight percent nickel, palladium or platinum on charcoal. (The weight refers to active metal catalyst plus charcoal, not to active metal catalyst alone.) The autoclave is then flushed with hydrogen, sealed, and hydrogen gas is injected to a pressure of, for example, over 20 atmospheres and up to 100 atmospheres or more. The autoclave is shaken to saturate the mixture, and additional hydrogen is added to bring the pressure back up. The autoclave is then slowly heated from room temperature at a rate of, for example, about 20° C. per hour, and the pressure increase is plotted against time (or temperature). Before the reaction starts, the graph of pressure vs. time or temperature will be very close to linear. The initiation of the hydrogenation reaction is detected by a somewhat lower rise than that extrapolated. When the reaction starts, heating is reduced and the temperature is allowed to increase by about 10° C. and it is there stabilized. At this temperature, the hydrogenation reaction rate will be about 0.01 mole per hour per gram of catalyst ("catalyst" refers to active metal plus charcoal). Reaction rates would increase by a factor of 2 for a 10° C. rise in temperature.

The hydrogenation reaction is normally carried out at temperatures within the range of from about 50° to 160° C., and preferably from about 90° to 110° C. The reaction is followed by observing the pressure decrease. When the pressure stops decreasing, the reaction has stopped.

Under the conditions described above, the hydrogenation is selective for the 5,6-position. Additional hydrogenation on the rings does not become significant until the temperature is increased about 50° C. above the temperature at which reaction is first observed.

The hydrogenated product is recovered by standard procedures such as by filtration to separate the catalyst, evaporation of the solvent, and recrystallization from a convenient solvent such as ethanol, butanol, cyclohexane, benzene, ethanol/water, or the like. Yields are usually 80 percent or higher.

Among the 5,6-dihydro-s-triazolo[5,1-a]isoquinolines that are within the invention are the following specific illustrative compounds:

2-methyl-5,6-dihydro-s-triazolo[5,1-a]isoquinoline,
2-trifluoromethyl-5,6-dihydro-s-triazolo[5,1-a]isoquinoline,
2-phenyl-5,6-dihydro-s-triazolo[5,1-a]isoquinoline,
8,9-dimethoxy-2-methyl-5,6-dihydro-s-triazolo[5,1-a]isoquinoline,
5-chloro-2-trifluoromethyl-5,6-dihydro-s-triazolo[5,1-a]isoquinoline,
6-chloro-2-methyl-5,6-dihydro-s-triazolo[5,1-a]isoquinoline,
9-chloro-2-phenyl-5,6-dihydro-s-triazolo[5,1-a]isoquinoline,
5-methylthio-2-methyl-5,6-dihydro-s-triazolo[5,1-a]isoquinoline,
9-[2-(N,N-dimethylamino)ethoxy]-2-methyl-5,6-dihydro-s-triazolo[5,1-a]isoquinoline, and the like.

The compounds of the invention are very useful. Because they are basic in nature, they can be used as hydrogen halide acceptors in processes such as the one disclosed in U.S. Pat. No. 3,071,605 for the production of cyclopentadienyl metal compounds. The compounds can be used as corrosion inhibitors in aqueous ethylene glycol-based cooling liquids. The compounds of the invention that contain active hydrogen atoms can be reacted with ethylene oxide to form surface active agents useful as wetting agents, detergents, and the like. The compounds are also useful as reaction intermediates.

The following examples illustrate the invention:

EXAMPLE 1

(a) N-(1-isoquinolyl)benzamidine 28.8 grams 1-aminoisoquinoline were dissolved in 100 ml. methylnaphthalene and 20.6 grams benzonitrile were added. The mixture was stirred and heated to 180° C. At this temperature, 28 grams aluminum chloride were added slowly. The reaction is exothermic. After having stirred the mixture at 180°–190° C. during another 2 hours, it was cooled down to room temperature and poured into 500 ml. water containing 50 ml. concentrated hydrochloric acid. The methylnaphthalene was decanted and the aqueous solution was extracted with benzene to remove the last traces of methylnaphthalene. The aqueous solution was then cooled to 0° C. and added slowly to a solution of 2 N-KOH until the precipitation was complete. It was extracted with diethylether and the dry etheral solution was evaporated and the residue dissolved in benzene. The benzene solution was passed through an aluminum oxide column and eluted with benzene. The desired amidine is in the benzene solution whereas the unreacted amine remains on the column.

The amidine was obtained by evaporation of the benzene and crystallized in cyclohexane. Yield: 44%, M.P. 110° C.

*Elemental analysis.*—Calcd. (percent): C, 77.71; H, 5.30; N, 16.99. Found (percent): C, 77.81; H, 5.32; N, 16.69.

(b) 2-phenyl-s-triazolo[5,1-a]isoquinoline 0.7 gram of N-(1-isoquinolyl)benzamidine was dissolved in 25 ml. benzene and 1.7 grams lead tetraacetate containing 45% acetic acid were added to the solution. The mixture was refluxed for 30 minutes with stirring and then cooled down to room temperature. The precipitate was filtered, washed with benzene and the filtrate was washed with an aqueous solution of 30% NaOH. The benzene layer was dried and evaporated, and the residue was crystallized in cyclohexane. Yield: 0.55 g. (79%), M.P. 159°–161° C.

*Elemental analysis.*—Calcd. (percent): C, 78.33; H, 4.52; N, 17.13. Found (percent): C, 78.42; H, 4.49; N, 17.33.

EXAMPLE 2

(a) N-(1-isoquinolyl)methylamidine 28.8 grams 1-aminoisoquinoline were dissolved in 400 ml. benzene and 25 grams acetonitrile and 50 grams AlCl₃ were added to the solution in an autoclave. The mixture was heated at 180°–190° C. for 2.5 hours. After cooling down to room temperature, the reaction mixture was poured into 500 ml. water containing 50 ml. concentrated HCl and the benzene was decanted, the aqueous solution cooled down to 0° C., and 2 N-KOH added until precipitation was complete. The crude amidine was dissolved in diethyl ether and the dried ethereal solution evaporated. The residue was dissolved in benzene and the benzene solution passed through a neutral aluminum oxide column. The amidine was eluted with benzene and the benzene solution evaporated. The residue was crystallized in cyclohexene. M.P. 128°–130° C. Yield 35%.

*Elemental analysis.*—Calcd. (percent): C, 71.33; H, 5.99; N, 22.69. Found (percent): C, 71.22; H, 5.98; N, 23.01.

(b) 2-methyl-s-triazolo[5,1-a]isoquinoline

This compound was prepared applying the same procedure described in Example 1(b).

From 5.55 grams amidine 4.9 grams (89%) of the desired title compound were obtained. M.P. 88°–89° C.

*Elemental analysis.*—Calcd. (percent): C, 72.11; H, 9.95; N, 22.94. Found (percent): C, 72.68; H, 5.22; N, 22.43.

EXAMPLE 3

(a) N-(1-isoquinolyl)trifluoromethylamidine

In contrast to the preparations of N-(1-isoquinolyl) alkyl- or aryl-amidines, in the case of trifluoroacetonitrile, no catalyst is needed. The reaction of the nitrile with the amine takes place at room temperature.

14.4 grams 1-aminoisoquinoline were dissolved in 200 ml. acetonitrile and 15 grams gaseous trifluoroacetonitrile were introduced slowly with stirring. After 65 hours standing at room temperature the solvent was evaporated and the residue was crystallized in a small quantity of cyclohexene. M.P. 58°–59° C. Yield 72.5%.

*Elemental analysis.*—Calcd. (percent): C, 55.23; H, 3.37; N, 17.57. Found (percent): C, 56.11; H, 3.60; N, 17.18.

(b) 2-trifluoromethyl-s-triazolo[5,1-a]isoquinoline

The procedure is analogous to Example 1(b), using the product of Example 3(a). The reaction time is, however, only 20 minutes. Yield: 40%. M.P. 130°–132° C.

*Elemental analysis.*—Calcd. (percent): C, 55.69; H, 2.55; N, 17.72. Found (percent): C, 55.40; H, 2.74; N, 16.89.

EXAMPLE 4

To a 250 ml. autoclave were charged 0.05 mole 2-methyl-s-triazolo[5,1-a]isoquinoline, 100 milliliters of isopropanol, and 1.5 gram of 5 weight percent palladium on charcoal (Type 16, from Johnson Mabbluy and Company). The autoclave was flushed with hydrogen, sealed and filled with hydrogen at room temperature to about 88 kilograms per cm.$^2$ pressure. The autoclave was slowly heated to 90° C. and held there until the hydrogen pressure levelled off. Reaction rate at 90° C. was $\frac{1}{50}$ mole/hour/gram of catalyst. The autoclave was cooled and vented, and the solvent was evaporated. After recrystallization from benzene/cyclohexane, there was obtained 2-methyl-5,6-dihydro-s-triazolo[5,1-a]isoquinoline. M.P. 54–56° C. in 80 percent yield.

*Elemental analysis.*—Calcd. (percent): C, 71.33; H, 5.99; N, 22.69. Found (percent): C, 71.44; H, 6.12; N, 22.83.

What is claimed is:
1. The compound 2-methyl - 5,6 - dihydro - s - triazolo [5,1-a]isoquinoline.

References Cited

UNITED STATES PATENTS

| | | | |
|---|---|---|---|
| 3,206,468 | 9/1965 | Grenda | 260—288 X |
| 3,388,130 | 6/1968 | Pesson | 260—288 X |
| 3,639,406 | 2/1972 | Reimlinger | 260—288 |
| 3,663,551 | 5/1972 | Deryckere | 260—288 |

OTHER REFERENCES

Nair et al.: Abstracted in Chem. Abstr. vol. 68, col. 105102(s) (1968).

Naqui et al.: Abstracted in Chem. Abstr. vol. 63, col. 8345 (1965).

DONALD G. DAUS, Primary Examiner

U.S. Cl. X.R.

200—283 CN, 289 R, 286 R; 260—294.9, 326.62, 346.1 R, 464, 465 R, 465.1, 465.7